United States Patent [19]
Elliott

[11] Patent Number: 5,597,104
[45] Date of Patent: Jan. 28, 1997

[54] DISPOSABLE COUPON HOLDER FOR A SHOPPING CART

[75] Inventor: Gregory E. Elliott, Livonia, Mich.

[73] Assignee: Charles Domen, Canton, Mich.

[21] Appl. No.: 529,089

[22] Filed: Sep. 15, 1995

[51] Int. Cl.⁶ .................................................. B60R 7/00
[52] U.S. Cl. ...................... 224/411; 224/277; 206/831; 280/33.992; 402/21; D34/27
[58] Field of Search ................... 224/277, 411, 224/536, 537; 280/33.992, DIG. 4; 211/10, 45, 50; 206/232, 425, 831; D34/27; 40/308; 402/21; 248/459

[56] References Cited

U.S. PATENT DOCUMENTS

| | | | |
|---|---|---|---|
| 352,588 | 11/1894 | Orphan | D34/27 |
| 352,589 | 11/1894 | Kennedy | D34/27 |
| 2,770,513 | 11/1956 | Brown | 108/46 |
| 4,274,567 | 6/1981 | Sawyer | 224/42.43 |
| 4,685,701 | 8/1987 | Amundson et al. | 281/42 |
| 5,002,215 | 3/1991 | Gregoire | 224/277 |

*Primary Examiner*—Henry J. Recla
*Assistant Examiner*—Timothy L. Maust
*Attorney, Agent, or Firm*—Charles W. Chandler

[57] ABSTRACT

A one-piece coupon caddy is a sheet formed with a series of coupons. The sheet has a pair of ears that are bent rearwardly from the body of the sheet. The two ears have slots that receive the horizontal bar of a shopping cart basket so that the coupons are visible to the shopper.

9 Claims, 1 Drawing Sheet

5,597,104

DISPOSABLE COUPON HOLDER FOR A SHOPPING CART

BACKGROUND OF THE INVENTION

This invention is related to a disposable one-piece coupon holder that may be mounted on the horizontal rod of a shopping cart.

Coupon holders or caddies, are commonly used by shoppers to hold coupons obtained from various sources. Usually the coupons are either unorganized, or are stored in a container where they are not readily visible to the shopper.

Examples of prior art coupon holders may be found in U.S. Pat. No. 4,274,567 which was issued Jun. 23, 1981 for "Shopping Cart Organizer" to Patricia F. Sawyer; U.S. Pat. No. 4,685,701 which was issued Aug. 11, 1987 to Anita L. Amundson and Joseph Tokay for "Shopping Cart Caddy"; and U.S. Pat. No. 5,002,215 which was issued Mar. 26, 1991 to Joseph R. Gregoire for "Portable Shopping Cart Coupon File and Method of Utilizing Same for Shopping".

SUMMARY OF THE INVENTION

The broad purpose of the present invention is to provide an improved disposable one-piece coupon holder that may be readily mounted on a shopping cart while displaying an array of coupons. When a coupon is matched-up with an item in the store, the coupon can be quickly identified, easily removed from the body of the holder and then held in a tab until the shopper reaches the checkout counter.

The preferred embodiment of the invention comprises a relatively stiff sheet of material having a pair of ears along opposite side edges at the upper part of the sheet. The ears are folded rearwardly from the body of the sheet. The two ears have slots that receive the rod on the shopping cart so that the sheet is supported in a generally vertical position. The front face of the sheet has integral coupons which are torn off as the shopper identifies an item corresponding to the coupon. When shopping has been completed, the coupon holder may be discarded. The coupon holder is easy to mount and can be inexpensively printed with current coupon offerings.

Still further objects and advantages of the invention will become readily apparent to those skilled in the art to which the invention pertains upon reference to the following detailed description of the preferred embodiment of the invention.

DESCRIPTION OF THE DRAWING

The description refers to the accompanying drawing in which like reference characters refer to like parts throughout the several views, and in which.

DESCRIPTION OF A PREFERRED EMBODIMENT

Figure 1:
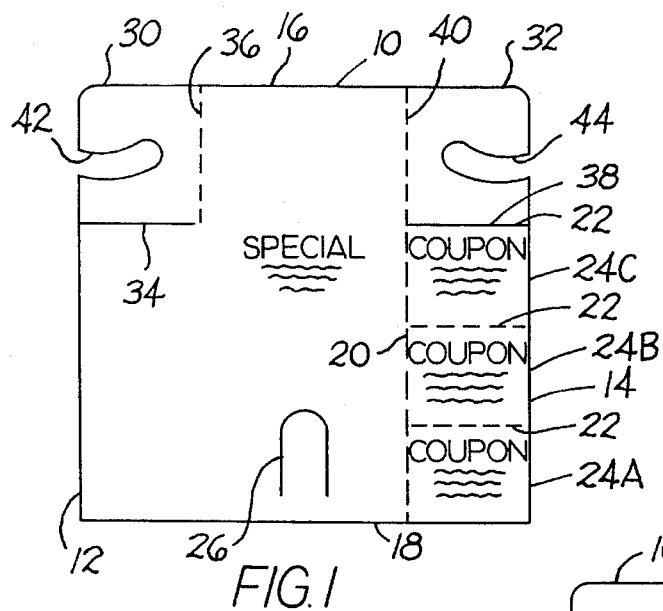
FIG. 1 shows a preferred coupon holder in its unfolded condition.

Referring to the drawing, FIG. 1 illustrates coupon holder 10 which is formed of a relatively stiff cardboard-like material which, for illustrative purposes, has a generally rectangular configuration with parallel side edges 12 and 14 defining a width of 6½", a top edge 16 and a parallel bottom edge 18 defining a height of about 6¼". The midsection of holder 10 has printed information referring to "special" items on sale, while one or both of the sides have printed coupons.

Figure 3:
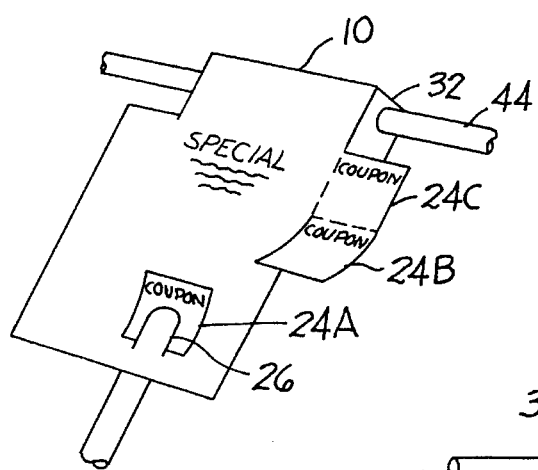
FIG. 3 shows the coupon holder of Figure I mounted on a shopping cart.

For example, FIG. 1 illustrates three coupons 24A, 24B and 24C. Each coupon is defined by vertical score line 20 and horizontal score lines 22 to assist the user in tearing and removing a coupon from the sheet, as illustrated in FIG. 3. In this case, coupon 24A has been removed from the coupon holder and placed within a U-shaped tab 26 which forms an integral part of the holder. A second coupon 24B is illustrated in the process of being torn from the holder.

Figure 4:
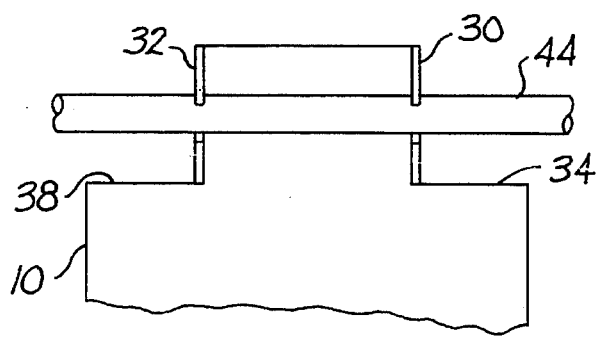
FIG. 4 is a view of the coupon holder of FIG. 3 from the opposite side thereof.

The holder has a pair of integral ears 30 and 32 at the upper left hand and right hand corners of the holder, as illustrated in FIG. 1. Ear 30 is formed by tearing the holder along a horizontal line 34 and then bending the ear rearwardly along a fold line 36. Ear 32 is similarly formed by tearing the bottom of the ear along a fold line 38 and then folding the ear rearwardly along fold line 40. Thus, both ears are bent rearwardly from the plane of the sheet, generally as illustrated in FIGS. 3 and 4.

Ears 30 and 32 have slots 42 and 44 respectively. The two slots have a somewhat banana-shaped configuration, and each opens inwardly from its respective side edges of the holder. The slots are designed to receive horizontal bar 46 of the shopping cart as illustrated in FIG. 3 so that the coupon holder is disposed in a generally vertical position, displaying the various specials and coupons.

Figure 2:
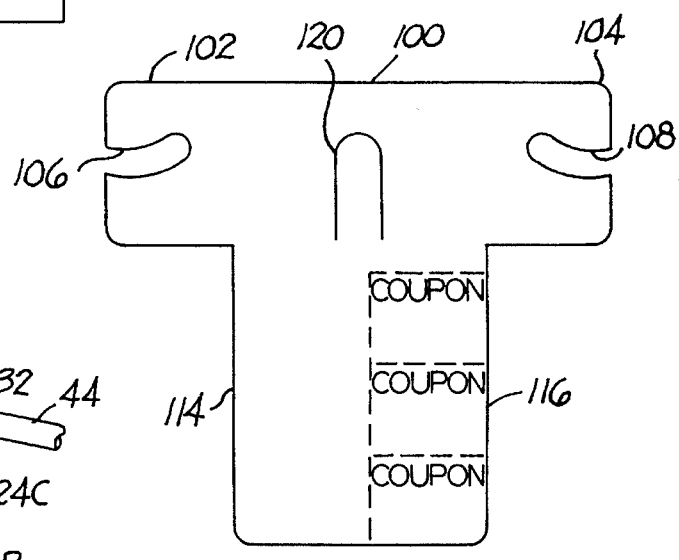
FIG. 2 illustrates another embodiment of the unfolded coupon holder.

FIG. 2 illustrates another embodiment of the invention in the form of a one-piece coupon holder 100 which also has a pair of ears 102 and 104 at the upper left and right hand corners respectively, of the body of the holder. This form of the invention is also formed of a cardboard-like material that is sufficiently stiff to display the coupons, but sufficiently tearable so the user can tear the coupons from the holder. The two ears, 102 and 104 also have a pair of slots 106 and 108, respectively, so that when the ears are bent rearwardly along fold lines 110 and 112, the ears can be mounted on the horizontal bar of the shopping cart to support the holder in an upright position. In this case, the two ears are bent along an extension of parallel side edges 114 and 116 of the holder. Holder 100 also has coupons that may be torn from the holder.

In this case, the slots could be formed in other portions of the ear, such as along the bottom edges of the two ears so long as they can be readily mounted on the shopping cart. Further, tab 120 is partially torn adjacent the top edge of the holder. The tab can be formed in other suitable locations for holding coupons that have been torn from the holder.

Thus, it is to be understood that I have described a coupon holder that can be inexpensively made, easily carried, easily mounted on the shopping cart, holds selected coupons in a convenient location, and then disposed of when the shopper has completed her shopping.

Having described my invention I claim:

1. A coupon holder for use on a horizontal rod of a shopping cart, comprising:

a planar sheet having a pair of spaced integral ears, and fold lines permitting each of the pair of ears to be folded down at right angles to the plane of the sheet;

a slot in each of said ears for receiving the horizontal rod of said shopping cart to support the sheet in a an inclined position;

indicia printed on the sheet within selected areas to be torn off from the sheet; and integral tab means on the sheet for supporting a portion of the sheet torn off therefrom.

2. A coupon holder as defined in claim 1, in which the sheet has opposite side edges, and the fold lines are parallel to an extension of the opposite side edges.

3. A coupon holder as defined in claim 1, in which the sheet has opposite parallel side edges, and the ears extend beyond the side edges.

4. A coupon holder as defined in claim 1, in which the sheet has an integral tab for holding the torn off area of the sheet.

5. A coupon holder as defined in claim 1, in which the coupon holder has a top edge and a bottom edge, and the ears are disposed closer to the top edge than to the bottom edge.

6. A coupon holder as defined in claim 1, in which each ear has a curved slot for receiving the horizontal bar of the shopping cart.

7. A coupon holder as defined in claim 1, in which the selected area of the sheet forms a coupon.

8. A coupon holder as defined in claim 1, in which the sheet has a coupon printed thereon and the coupon may be removed from the sheet.

9. A coupon holder for use on a horizontal rod of a shopping cart, comprising:

a planar sheet having a pair of spaced integral ears, and parallel fold lines permitting each of the pair of ears to be folded down at right angles to the plane of the sheet;

a slot in each of said ears for receiving the horizontal rod of said shopping cart to support the sheet in an inclined position; and indicia printed on the sheet.

* * * * *